United States Patent [19]

Harvey et al.

[11] 4,302,018
[45] Nov. 24, 1981

[54] PACKER ARRANGEMENTS FOR OIL WELLS AND THE LIKE

[75] Inventors: Andrew C. Harvey, Waltham; David H. McFadden, Brookline, both of Mass.

[73] Assignee: Foster-Miller Associates, Inc., Waltham, Mass.

[21] Appl. No.: 125,981

[22] Filed: Feb. 29, 1980

[51] Int. Cl.³ ............................................. F16J 15/46
[52] U.S. Cl. .................................... 277/27; 277/34; 277/73; 277/236
[58] Field of Search ...................... 277/3, 27, 236, 73, 277/34, 34.3, 34.6, 226, 188 A

[56] References Cited

U.S. PATENT DOCUMENTS

| 553,738 | 1/1896 | Raynsford | 277/73 |
| 2,192,805 | 3/1940 | Seamark | 277/34 X |
| 2,237,709 | 4/1941 | Lowe | 277/34.3 |
| 2,529,744 | 11/1950 | Schweitzer | 277/73 |
| 3,298,719 | 1/1967 | Bills et al. | 277/236 X |
| 4,178,020 | 12/1979 | Dapyera | 277/236 X |
| 4,256,314 | 3/1981 | Berglund et al. | 277/73 X |

FOREIGN PATENT DOCUMENTS 186594  3/1924  United Kingdom ............... 277/236

Primary Examiner—Robert S. Ward, Jr.

[57] ABSTRACT

The packer includes an elongated tubular casing, and a metal ring is disposed in its entirety within an annular recess in the casing. The recess has a circumferential opening extending entirely around the peripheral outer surface of the casing. Hydraulic fluid is flowed into the recess to apply pressure to the inner peripheral surface of the metal ring to expand the ring radially outwardly and force its outer peripheral surface through the circumferential opening and into annular sealing engagement with the opposed surface of the well casing.

11 Claims, 9 Drawing Figures

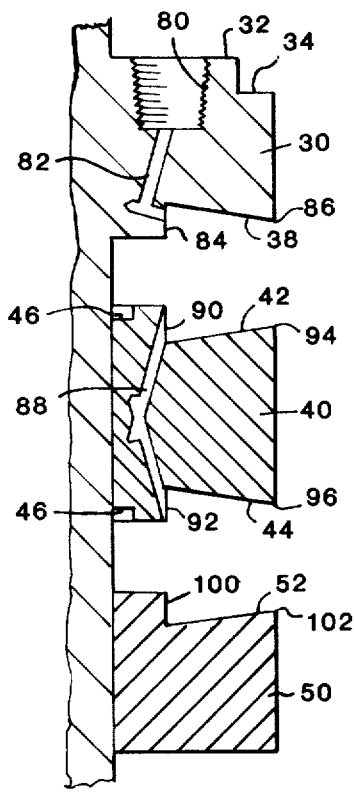
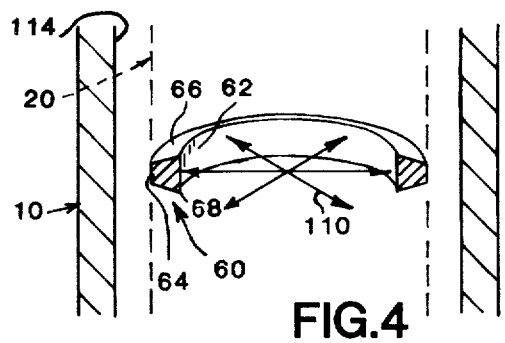
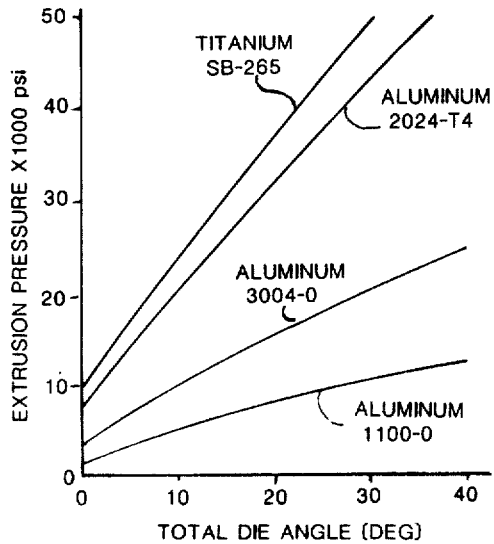
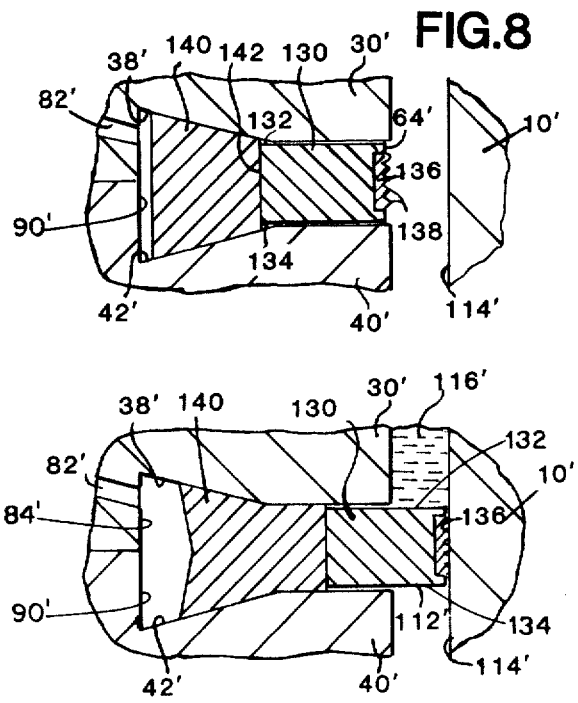

PACKER ARRANGEMENTS FOR OIL WELLS AND THE LIKE

The Government has rights in this invention pursuant to Contract No. 13-0246A awarded by the U.S. Department of Energy.

This invention relates to technology for subterranean recovery of oil and the like, and more particularly to seal arrangements for oil wells and the like.

A variety of seal or packer arrangements have been devised to seal petroleum producing wells. A typical seal arrangement is of the baffle type, in which one or more cylinders are placed in longitudinal compression. Typical materials for these types of deformable seals are elastomers and special components such as graphite, asbestos, and wire. In oil recovery enhancement techniques, and in wells used in geothermal production, the packer frequently must seal the casing or tube annulus under conditions of elevated temperature, high pressure and corrosive surface environment. Because of the harsh environment and other technical requirements associated with such applications, a very durable seal that can be deployed with relative ease is necessary.

In accordance with the invention, there is provided a packer that includes a body member with an annular recess in which a metal ring in its entirety is disposed. The recess has an annular opening at the outer surface of the body and has an outer peripheral surface for sealing engagement with the casing wall. Application of hydraulic pressure on the inner peripheral surface of the ring causes radially outward expansion and plastic deformation of the ring and forces the outer peripheral surface of the ring through the annular opening of the recess and into sealing engagement with the opposed surface of the casing or tube in which the packer is disposed.

In preferred embodiments, the packer body is an elongated tubular casing, and the metal ring is disposed in its entirety within the annular recess in the casing. Hydraulic fluid is flowed into the recess to expand the ring radially outwardly and force its outer peripheral surface through the circumferential recess opening and into annular sealing engagement with the opposed surface of the casing. Juxtaposed die surfaces in the recess are inclined towards one another (preferably at a total die angle of less than fifty degrees) in the radially outward direction. The metal ring itself (or a supplemental ring of greater ductility than the packer seal ring) has a trapezoidal cross sectional shape with surfaces of that ring in sealing engagement with the inclined die surfaces so that application of hydraulic pressure to that ring produces plastic deformation of the trapezoidally shaped sealing ring and at the same time forces a portion of the metal packer seal ring through the circumferential opening. While aluminum and titanium are useful metals, other similar metals may also be utilized. Supplemental sealing enhancement means in the form of surface treatment or added material may be applied to the outer peripheral surface of the metal packer seal ring.

The packer is a compact device which provides a durable and conformable seal that is particularly useful in harsh subterranean environments where high pressures and high temperatures and corrosive conditions are encountered.

Further features and advantages of the invention will be seen as the following description of particular embodiments progresses, in conjunction with the drawings, in which:

FIG. 3 is a sectional view, similar to FIG. 2 and on a larger scale, of die components of the packer shown in FIG. 2;

FIGS. 4 and 5 are diagrammatic views of the packer showing the seal ring in initial condition (FIG. 4) and in deployed condition (FIG. 5);

FIG. 7 is a graph indicating characteristic packer rings of various materials of configuration similar to that shown in use in the packer shown in FIGS. 1 and 2;

FIG. 8 is a sectional view of another packer ring embodiment; and

FIG. 9 is a sectional view, similar to FIG. 8, showing the packer ring in deployed condition.

DESCRIPTION OF PARTICULAR EMBODIMENTS

Figure 1:
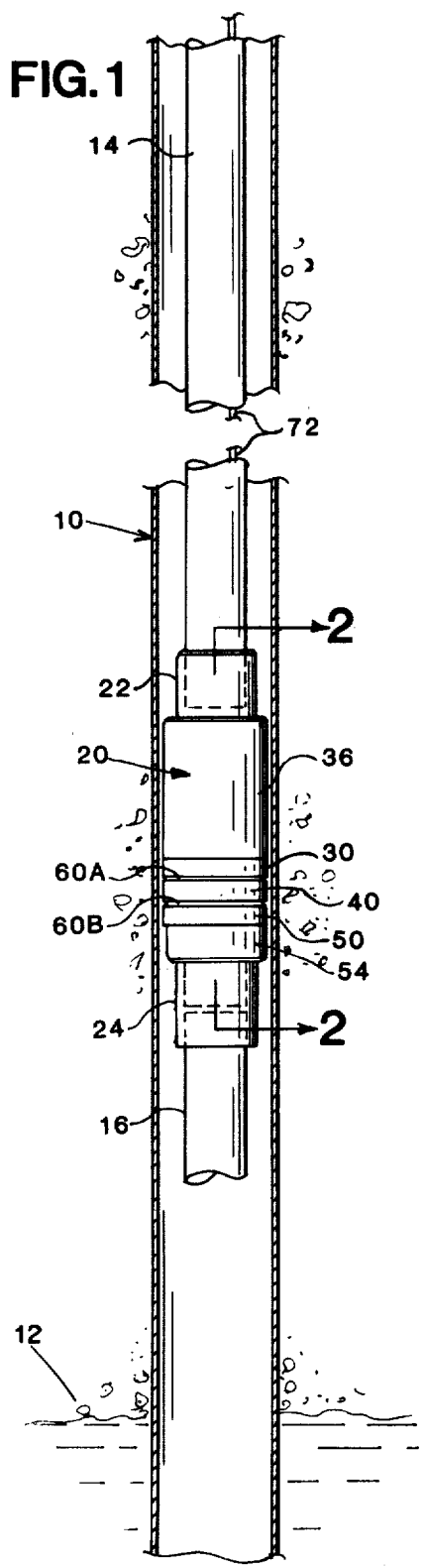
FIG. 1 is a diagram of a typical application of a packer in accordance with the invention.

Shown in FIG. 1 is a casing 10 that extends downwardly from the surface of the ground to an oil reservoir 12 or other subsurface geologic formation. Disposed within casing 10 is an integrated flowing system that includes tubing sections 14, 16 (and other appropriate hardware not shown) and a packer unit 20 that has an upper coupling 22 connected to tubing section 14 and a lower coupling section 24 connected to tubing section 16.

Figure 2:
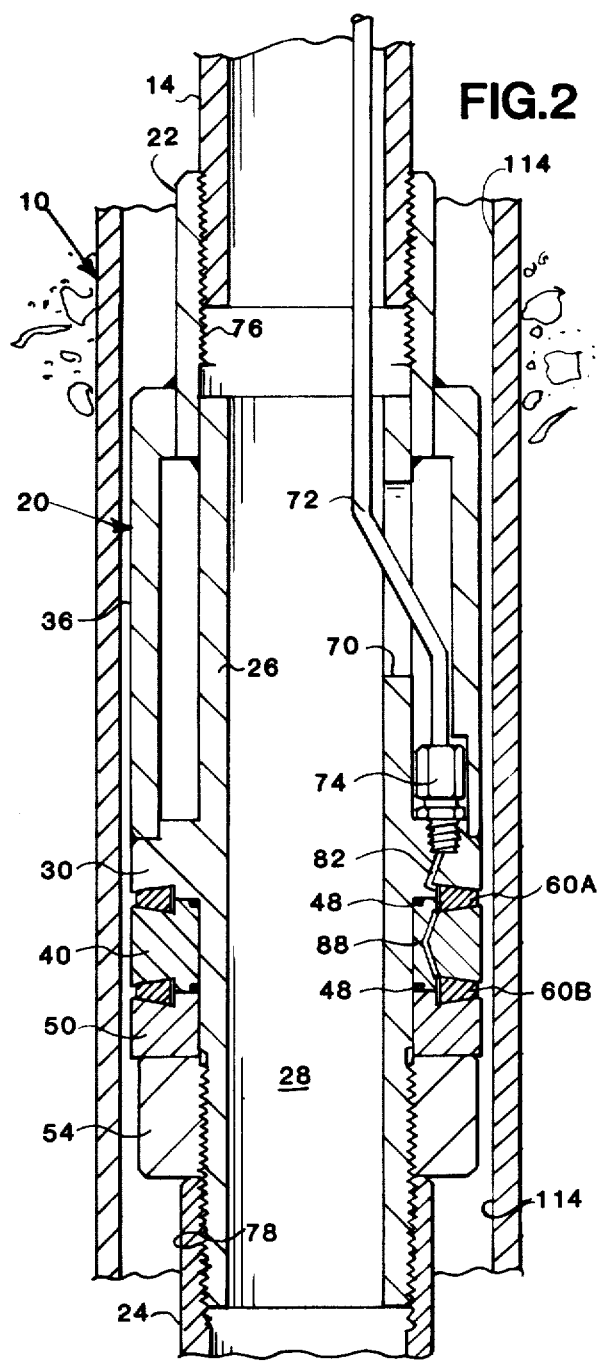
FIG. 2 is a sectional view taken along the line 2—2 of FIG. 1.

Further details of the packer may be seen with reference to FIG. 2. Casing 10 has an inner diameter of about $6\frac{3}{4}$ inch. The packer includes a tubular body 26 of heat treated tool steel (e.g., 4140) that is about fifteen inches in length and defines a through passage 28 about $2\frac{1}{2}$ inches diameter. Formed integrally with body 26 is an annular flange 30 that has an outer diameter of about $5\frac{7}{8}$ inch and an axial height of about $1\frac{1}{4}$ inch. Formed on upper surface 32 is an annular peripheral recess 34 (FIG. 3) which receives sleeve 36; and formed in the lower surface of flange 30 is an inclined annular die surface 38. Seated on flange 30 are series of two die rings 40, 50 that are secured by nut 54 that is threadedly received on the lower end of tube 26. Formed in die ring 40 are two die surfaces 42, 44 each inclined at $7\frac{1}{2}$ degrees. Inclined die surface 52 is similarly formed in ring 50.

A metal ring 60 of trapezoidal cross-sectional configuration is disposed in each recess defined by opposed die surfaces 38, 42 and 44, 52. Each ring has a width or radial dimension of 11/16 inch, a height at its inner peripheral surface 62 of 0.5 inch, a height at its outer peripheral surface 64 of 0.3 inch. The upper and lower surfaces 66, 68 of each ring 60 are clamped firmly between the opposed extruding die surfaces 38, 42 and 44, 52 when the die rings 40, 50 are clamped against die flange 30 by nut 54.

Body 26 has an aperture 70 at its upper end through which extends a length of one-quarter inch stainless steel tubing 72 that has a burst strength of about 40,000 psi and that is connected by fitting 74 to flow passage 82 formed in flange 30. Coupling 22 is welded to body 26 and has internal threads 76 that engage tubing section 14 while the lower end of body 26 has external threads 78 on which coupling 24 is received.

Further details of die flange 30 and die rings 40, 50 are shown in FIG. 3. Threaded hole 80 in upper surface 32 of flange 30 receives coupling 74. Passage 82 extends to an outlet in cylindrical die recess surface 84 (which has a diameter of about 4¼ inch). Extrusion surface 38 is inclined downwardly in an outward direction at an angle of 7½ degrees and extends to lip 86. Ring 40 has similar annular axially extending surfaces 90, 92 in which are formed ports of through passage 88, and similar annular extrusion lips 94, 96. Ring 50 has a similar annular wall 100 at the inner edge of inclined extrusion surface 52 and an annular lip 102 at the outer periphery of extrusion surface 52. With the extrusion rings 40 and 50 clamped against flange 30, seals 48 in grooves 46 seal the joints between the rings and two annular recesses of trapezoidal configuration are defined, each of the same shape and each of about ¾ inch radial length. Disposed in each recess is a metal seal ring 60, the inclined surfaces 66, 68 of which are firmly clamped and sealed against the upper and lower extruding surfaces of the recess.

Figure 6:
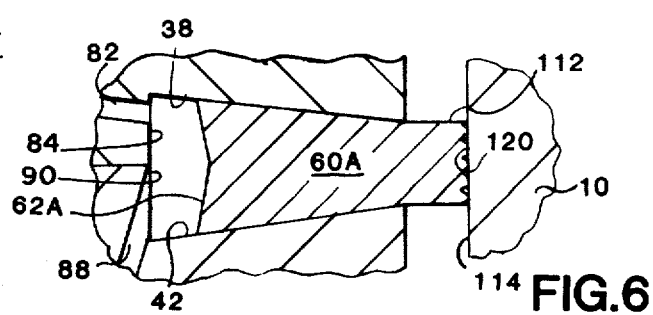
FIG. 6 is a sectional view, similar to FIG. 2 but on a larger scale, showing a packer ring in deployed condition.

Hydraulic fluid applied through line 72 and coupling 74 flows through passage 82 and acts against the inner surface 62 of the upper ring 60A and through passage 88 to the lower recess and similarly acts against surface 62 of ring 60B, as indicated by arrows 110. As the fluid pressure in the radial outward direction on the back faces 62 of the rings increases, each ring is deformed first elastically and then plastically as the ring is forced through the lips of each die in an extrusion action creating a ring of greater diameter and surface area, with an extruded seal ring portion 112 and with outer surface 64 seated against the inner surface 114 of casing 10 as indicated in FIGS. 5 and 6.

The required fluid pressure is a function of the die angle, the necessary radial extension, the ring material, and the ring geometry. Shown in FIG. 7 is a graph indicating the required fluid pressure for aluminum and titanium ring materials as a function of total die angle. The packer is designed to withstand a maximum temperature of 650 degrees F. with a useful life as a function of the differential pressure it supports. Where potentially large pressure induced forces act on the seal ring portion 112 at maximum temperatures and for long life situations (greater than one year), a packer fluid 116 can be placed on top of the seal ring 112 to reduce or eliminate the pressure differential across the seal and greatly reduce metal creep effects. The hydraulic pressure may be increased if desired by the incorporation in the packer 20 of differential area piston intensifiers between supply tube 72 and passages 82. Sealing efficiency can be modified by changing ring geometry, for example, by altering sealing area or changing the outer edge configuration of the ring. The addition of serration 120 to surface 64, or other surface treatments allows the ring to seal effectively against irregular casing surfaces. By altering the initial ring geometry, the die angle, or the ring thickness, the effective seal area can be adjusted, and the deployed seal ring 112 can be strengthened by work hardening effects. Appropriate preventive means can be used to minimize environmental effects, such as ring corrosion.

The packer arrangement is a compact device with a minimum of components which provides a durable and conformable seal that is particularly useful in harsh environments. Another seal arrangement is shown in FIGS. 8 and 9. Similar components in that figure have been identified with primed reference numerals, for example, casing 10'. The seal ring 60' is a composite of a titanium ring 130 with parallel upper and lower faces 132, 134 disposed in sliding fit between parallel radially extending zero angle die surfaces; and a heat shrunk aluminum ring 136 disposed in an annular recess in the outer peripheral surface 64'. Aluminum insert 136 carries serrations 138 that projects beyond the outer face 64' of the titanium ring 130. An inner ring 140 of aluminum (1100-0) of trapezoidal cross-section is positioned inside titanium ring 130 with the outer peripheral surface 142 of ring 140 abutting the inner peripheral surface of ring 130. The upper and lower inclined surfaces of ring 140 are seated against extrusion surfaces 38' and 42' of the die members.

Application of hydraulic pressure through line passage 82' acts against the inner surface 62' of aluminum ring 140, forcing that ring outwardly in an extrusion process which acts against the inner surface of titanium ring 130. The titanium ring is expanded radially through the "zero angle" die to the position shown in FIG. 9 with the aluminum seal 136 seated against wall 114' of casing 10' as shown in FIG. 9.

While particular embodiments of the invention have been shown and described, various modifications will be apparent to those skilled in the art, and therefore it is not intended that the invention be limited to the disclosed embodiments or to details thereof and departures may be made therefrom within the spirit and scope of the invention.

What is claimed is:

1. A packer for use in an oil well system or the like comprising
    a body for disposition in an elongated tubular casing,
    an annular recess in said body, said recess having a circumferential opening that extends entirely around the peripheral outer surface of said body,
    a metal ring disposed entirely within said recess, said ring being of ductile material and having an outer peripheral surface for sealing engagement with the casing wall and an inner peripheral surface, and
    a port in said recess for flowing hydraulic fluid into said recess to apply pressure to the inner peripheral surface of said metal ring to expand said ring radially outwardly and force said outer peripheral surface through said circumferential opening and into annular sealing engagement with the opposed surface of said casing.

2. The packer of claim 1 and further including juxtaposed die surfaces in said recess, said die surfaces being inclined towards one another in the radially outward direction towards said circumferential opening, said ring having a trapezoidal cross sectional shape with surfaces of said ring in sealing engagement with said die surfaces so that application of hydraulic pressure to said ring produces plastic deformation of said ring and extrusion of a portion of said metal ring through said circumferential opening.

3. The packer of claim 1 wherein said body is of elongated tubular configuration with a cylindrical outer surface in which said circumferential opening is formed, and has coupling structure at each end of said body for attachment to a tube string or the like.

4. The packer of claim 1 and further including means on the outer peripheral surface of said ring for enhancing the effectiveness of the seal against said casing surface.

5. The packer of claim 1 wherein said ring includes an inner annular component of soft metal and an outer annular component of harder metal.

6. The packer of claim 5 wherein said inner annular component is of trapezoidal cross sectional shape and said outer annular component is of rectangular cross sectional shape.

7. The packer of claim 6 wherein said inner annular component is of aluminum and said outer annular component is of titanium.

8. The packer of claim 1 wherein the metal of said ring is selected from aluminum and titanium and alloys thereof.

9. The packer of either claim 1 or 4 and further including a supplemental ring of more ductile material than said metal ring, said supplemental ring being disposed in said recess inside of said metal ring.

10. The packer of either of claims 1-5 wherein the radial cross sectional width of said metal ring is greater than the space between the outer surface of said body and the inner surface of said casing, and the radial cross sectional width of said recess is greater than the radial cross sectional width of said metal ring.

11. The packer of claim 2 wherein the total included angle of said juxtaposed die surfaces is less than fifty degrees.

* * * * *